Nov. 26, 1935.  A. KOVALOVSKY  2,022,204

FISHING REEL

Filed Oct. 8, 1934   3 Sheets-Sheet 1

INVENTOR.
Arthur Kovalovsky

BY

ATTORNEY.

Nov. 26, 1935.    A. KOVALOVSKY    2,022,204
FISHING REEL
Filed Oct. 8, 1934    3 Sheets-Sheet 2
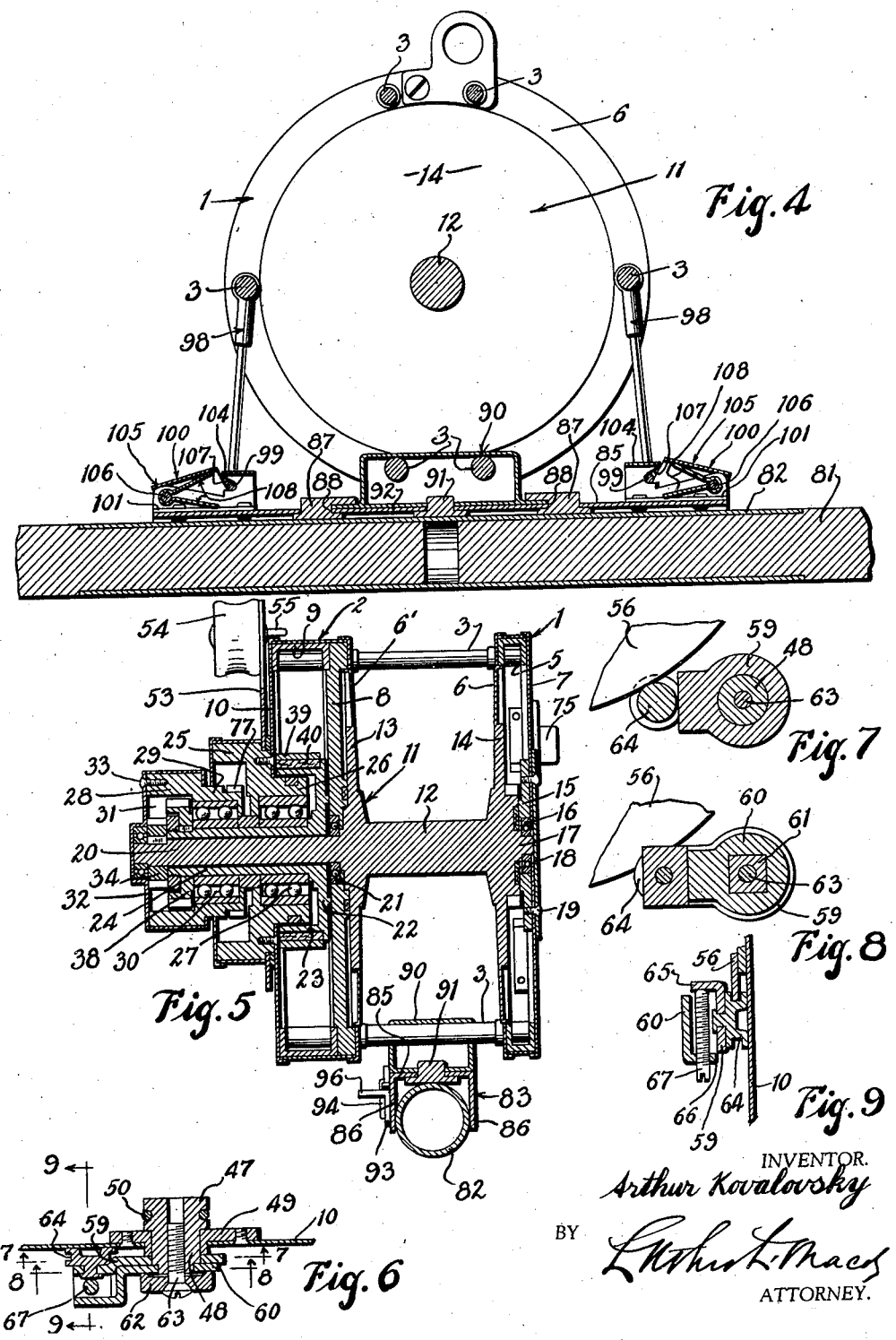
ATTORNEY.

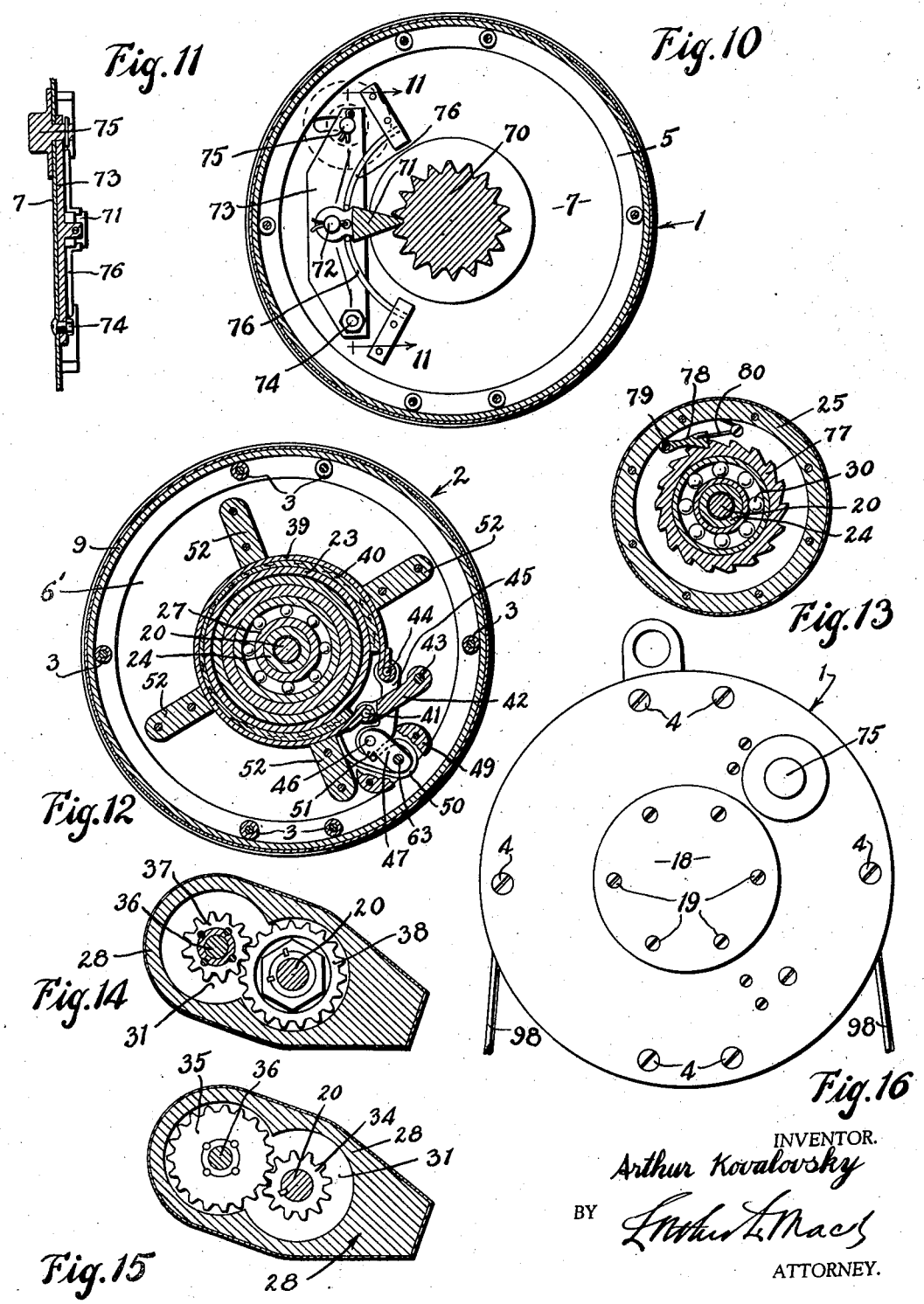

Patented Nov. 26, 1935

2,022,204

UNITED STATES PATENT OFFICE 2,022,204

FISHING REEL

Arthur Kovalovsky, Los Angeles, Calif.

Application October 8, 1934, Serial No. 747,409

14 Claims. (Cl. 242—84.5)

The objects of my invention are:

First, to provide a fishing reel of substantial and durable construction particularly adapted for deep sea fishing and provided with a manually operable adjustment for varying the drag on the reel when a "catch" is made and the line is being payed out, together with means for mounting said adjustment on a stationary portion of the reel frame instead of on the handle.

Second, to provide an auxiliary adjustment whereby the wear on the brake may be compensated for without disassembling the reel.

Third, the provision of a friction brake including a rotatable drum and an adjustable band wherein the brake drum is back geared to the reel by means of a planetary train of gears so arranged that a maximum efficiency of the brake may be provided.

Fourth, the provision of a suitable gauge on the periphery of the reel frame by means of which the friction of the brake may be visibly indicated; and Finally, the provision of a simple mechanism, the moving parts of which are enclosed so that they may be thoroughly lubricated without leakage of the lubricant and said moving parts may be supported in frictionless bearings so as to provide facility of operation and durability.

Still other objects may appear as the description of my invention progresses.

In the consideration of this invention attention is called to Letters Patent of the United States No. 1,958,919, granted to me on the 15th day of May, 1934, for Fishing reels, over which the present invention embodies certain notable improvements.

I have shown a preferred form of my invention in the accompanying drawings in which:

Fig. 4 is a sectional elevation of the reel and rod on line 4—4 of Fig. 2;

Fig. 5 is a transverse section of the same on line 5—5 of Fig. 1;

Fig. 6 is a section of the auxiliary brake adjusting means on line 6—6 of Fig. 1;

Figure 2:
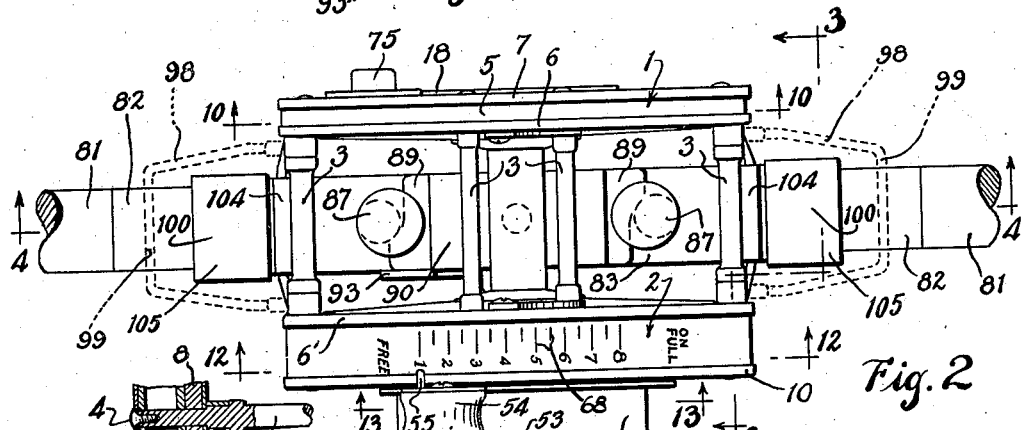
Fig. 2 is a plan view of the same.

Figs. 7, 8, and 9, are, respectively, sections on lines 7—7, 8—8, and 9—9 of Fig. 6, showing structural details of the auxiliary brake adjustment means;

Fig. 10 is a longitudinal section of the reel on line 10—10 of Fig. 2;

Fig. 11 is a fragmentary section on line 11—11 of Fig. 10;

Fig. 12 is a longitudinal section of the reel frame and brake mechanism on line 12—12 of Fig. 2;

Fig. 13 is a longitudinal section of the detent mechanism on line 13—13 of Fig. 2;

Figs. 14 and 15 are, respectively, sections of the handle on lines 14—14 and 15—15, showing the back gearing;

Fig. 16 is a rear end view of the reel.

The reel includes a rear end member 1 and a front end member 2, both of which are hollow and substantially spaced apart. Said end members are connected at a plurality of points by means of spacers 3, 3, etc. concentrically arranged around the axis of the reel and suitably connected at their ends to the end members, as by means of screws 4, 4, etc. or otherwise.

Member 1 is preferably formed of an annular member 5 of U. cross section over which inner and outer plates 6 and 7 are fitted, as shown in Fig. 5, for enclosing certain parts within the end 1. End 2 has a rear wall 8, an annular member 9 and a front plate 10 which, when fitted together as shown and held by means of the spacers 3, provide an enclosed space between the front and rear walls 10 and 8.

A reel, or spool 11 is axially mounted on the frame and has a hub 12 and front and rear flanges 13 and 14, respectively, which are rotatably held in central openings formed in the plate 6 of the rear end and a similar plate 6' on the front end adjacent wall 8. End 1 has an axial portion 15 which is bored to receive and support a frictionless ball or roller bearing 16 and in which bearing a trunnion 17 formed on the rear end of the reel is rotatably held. A plate 18 forms a cover for the end of bearing 16 and is secured to the rear end plate 7 by means of screws 19, 19 etc.

The front end of the reel 11 has an axially projecting stem 20 which is rotatably held in a frictionless bearing 21 carried by the wall 8 of end 2. A brake 22 having an annular rim 23 is mounted in the space between the walls 8 and 10 of end 2 and has a hollow stem 24 which telescopes the stem 20 of reel 11, as shown in Fig. 5. Brake drum 22 is secured to the stem 20 of reel 11 as hereinafter described.

Front wall 10 of end member 2 carries a central hub 25 which has a reduced inner portion 26 adapted to telescope into the recess of drum 22 for the purpose of supporting a frictionless ball or roller bearing 27 through which the stem 24 of the drum is extended. A handle 28 is rotatably mounted on the outer portion of brake drum stem 24 and has a reduced inner portion 29 which extends into a recess in the hub 25 and carries a frictionless bearing 30 for the outer portion of stem 24.

Said handle has a recess 31 formed therein which is closed by means of a cover plate 32 held in position by means of screws 33, 33, etc. and adapted to enclose within said recess 31 a train of gears for back gearing the drum to the reel, as shown in Figs. 5, 14, and 15. The back gearing includes a pinion 34 fixed to the end of stem 20 and adapted to mesh with a larger gear 35 loosely mounted on a counter shaft 36 carried by handle 28. Gear 35 is fixed for rotation with a pinion 37 on countershaft 36 and pinion 37 is adapted to mesh with a larger gear 38 which is fixed to stem 24 of the brake drum. Thus, the brake drum being back geared to the reel will rotate at a substantially lesser speed than if it were directly connected with the reel, thereby preventing undue speed of the brake drum and consequent burning of the brake. Also, the handle being connected by means of planetary gearing to the reel will rotate at less speed than the reel. Usually the handle is geared to the reel at a two to one ratio and the brake drum is geared at a three to one ratio, more or less, depending upon requirements.

The drum rim 23 is encompassed by means of a brake band including a metal carrier band 39 to which is suitably attached a friction band 40. As shown in Fig. 12, one end of the brake band is connected at 41 to an end of a link 42 which is pivotally held at 43 on wall 8 of end 2, while the other end of the brake band is connected at 44 to an end of a link 45 which is connected at 46 to an end of an adjustor arm 47. Adjustor arm 47 has a hub 48 which is rotatable in a bearing 49 secured to the front wall 10 of end 2 (see Fig. 6) and is held in tension by means of a spring 50 which is coiled around the hub of the arm and has an end resting upon a shoulder 51 formed on the end of said arm. The other end of spring 50 rests against one of a plurality of lugs 52, 52, etc, which are concentrically arranged around the exterior of the brake band 39 and serve to limit the expansion of said band, as shown in Fig. 12. Thus, the spring 50 tends to expand the brake band away from the drum rim 23.

Figure 1:
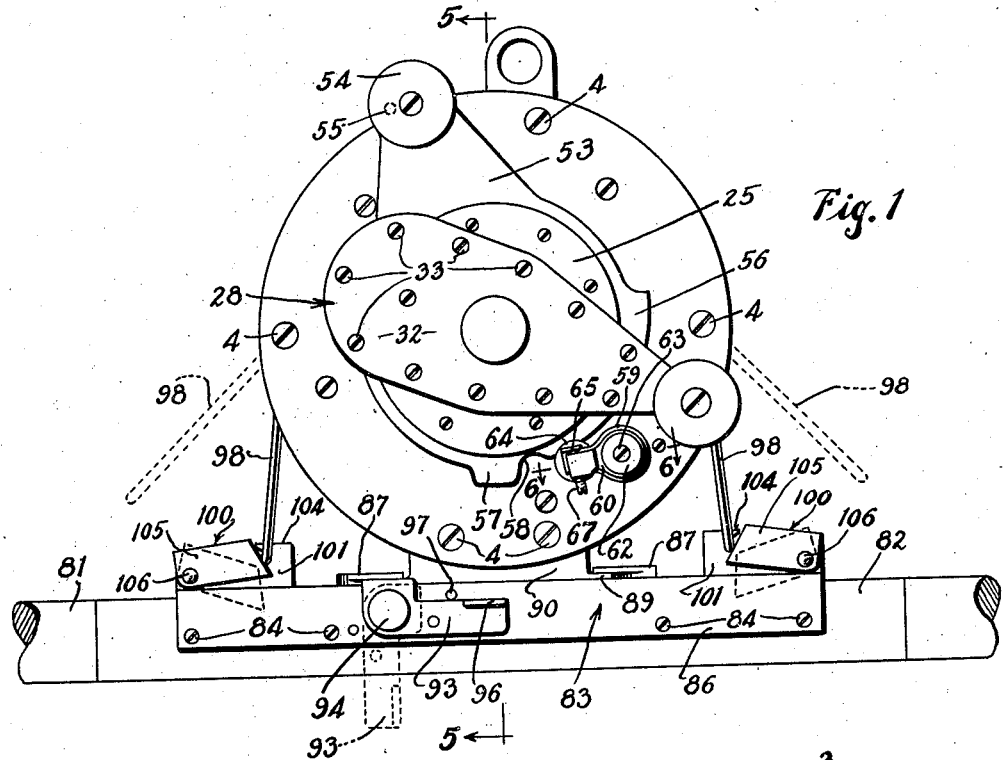
Fig. 1 is an end elevation of the reel operatively mounted upon a staff or rod and showing a means for detachably securing the reel to the rod.

Externally of front wall 10 I provide a manually adjustable lever 53 with a suitable handle 54 and a pointer 55 which overlies the periphery of end member 2. Said lever is rotatable on the hub 25 adjacent the outer face of wall 10 and has a cam 56 associated with the auxiliary adjustment of the brake band of which adjustor arm 47 is a part. Said cam is provided with an eccentrically formed dwell (56) and a stop extension 57 between which is a depression 58, as shown in Fig. 1.

Hub 48 loosely supports an arm 59 adjacent the outer end of bearing 49 and fixedly supports an overlying arm 60 on a squared portion 61 at its end. Said arms 59 and 60 are held on the hub 48 by means of a washer 62 and a retaining screw 63. The loosely held arm 59 carries at its end a peripherally grooved boss 64, the groove of which is adapted to engage the periphery of cam dwell 56. (See Figs. 6 to 9, inclusive). Arm 59 has an outwardly bent lug 65 and arm 60 has an inwardly bent lug 66, as shown in Fig. 9, and an adjusting screw 67 is carried by lug 66 for engagement with lug 65, whereby the relation of boss 64 with cam 56 may be adjusted to compensate for any wear which may occur in the friction band 40 of the brake.

The periphery of end 2 may be provided with suitable graduations, or calibrations 68 within the range of movement of the pointer 55 of the lever 53, whereby the brake drag may be adjusted to any desired extent. Likewise numerals representing different and successive units of friction or drag on the reel may be provided adjacent said graduations, as shown, for manually adjusting the reel to various requirements of fishing and depending upon the size of a catch and other conditions.

In the rear end 1 I provide a somewhat conventional "click" for the usual purpose, as shown in Fig. 10, and said device may include a star wheel 70 formed on or attached to the rear flange 14 of the reel 11, and a pawl 71 pivotally mounted on one of the walls of end 1 and adapted to swing in opposite directions. Preferably the pawl 71 is carried by a swinging plate 73 which is pivotally held at 74 at one end and has a pin or other device 75 at its other end which may extend through the rear wall of end 1 for manually releasing the pawl from engagement with the star wheel. Springs 76 of any suitable form may be provided for tensioning the pawl as it is moved in either direction.

Handle 28 has a ratchet 77 within the recess of hub 25, as shown in Fig. 13, adapted to be engaged by a pawl 78 which is pivoted at 79 to said hub and is operatively held by means of a suitable spring 80.

Referring to Figs. 1, 2, and 4, particularly, it will be noted that I have provided a substantial and readily operative detachable means for connecting the reel to a staff or rod, as at 81. In this connection it will be understood that in deep sea fishing for large fish a staff is usually provided for carrying the reel and said staff is pivotally mounted on the bottom of a boat and is substantially vertical, so that the hands of the fisherman are as free as possible for use in the operation of the reel. For a small reel, however, an ordinary rod may be used with the same or a slightly modified attaching means.

The attaching device is partly on the reel and partly on the rod, as shown, and includes a metal sleeve 82 on the rod 81 to which I permanently, or at least rigidly, attach a base 83 of substantially U shaped cross section, as by means of screws 84, 84, etc. Said base has a flat top web 85 and sides 86, 86. At spaced positions intermediate the ends of the base 82 I provide a pair of lugs 87, 87 which are grooved at 88, 88, on adjacent sides to receive flanges 89, 89, formed at opposite ends of a bracket 90 which is supported on a pair of the spacers 3 of the reel frame. Centrally of said lugs I provide a swivel pin 91 which seats in a corresponding hole in the bottom 92 of the bracket 90. As shown in Fig. 2, it will be noted that the flanges 89, 89 of said bracket are cut away at diagonally, opposite points so that when the bracket is first seated on the swivel pin 91 it may be rotated so that the narrower portions of the flanges 89 will swing inwardly under the tops of the lugs 87 until the wider portions thereof abut the lugs, at which time the bracket 90 will be longitudinally disposed on the base 82.

A lock 93 is provided on a side of base 82 which is pivoted to the base at 94 and has a heel which, when the lock is horizontally disposed as shown in Fig. 1, will overlie the edge of the bracket 90 and prevent the displacement of the bracket from operative position. A lug 96 is provided at the end of the lock arm by means of which the lock may be swung into and from locking position. A pin 97 in base 83 limits the upward movement of the lock from the open position shown in broken lines in Fig. 1.

While the attaching means described provides a rigid connection between the reel frame and the rod, due to the excessive strains frequently placed on the mechanism while in use I provide additional attaching means which combine to brace the reel frame on the rod longitudinally and transversely. Said additional means comprise a pair of U shaped braces 98, 98 which are pivotally supported at the ends of their legs on diametrically opposite spacers 3, 3 and have centrally formed and transversely disposed portions 99, 99, extending crosswise of the base and adapted to be detachably held in snap fastenings 100, 100 secured to the upper side of base 83 at points outwardly of the lugs 87, 87.

Figure 3:
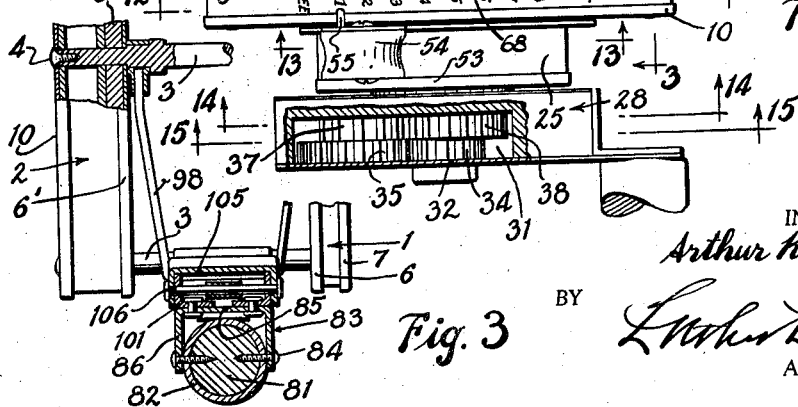
Fig. 3 is a fragmentary section of the same on line 3—3 of Fig. 2.

The fasteners 100 include rigid members 101 with bifurcated base portions 102, 102 which are secured to the top 85 of base 83 and are provided with side portions 103, 103 and a cross bar 104, all of which portions are preferably integral. U shaped latches 105 are associated with the stationary members 101 and are pivoted to said members 101 by means of pins 106 in such a manner that the sides of the members 105 will overlie the sides of the members 101, as shown in Fig. 3. The sides 103 of members 101 are provided with inwardly extended notches 107 in which the transverse portions 99 of the braces 98 seat when the braces are attached to the base 83 and the sides of members 105 when they are upwardly extended, as shown in Fig. 4, serve to retain the braces in their attached positions. Springs 108 are carried on the pins 106 and have their opposite extremities engaging the tops of members 105 and the bottoms of members 101, thus tending to normally urge the members 105 upwardly into closed positions.

In operation, the reel is attached to the rod 61 by first centering the reel frame on the pin 91 and then rotating the frame on base 83 until the flanges 89 engage the lugs 87 as described, whereupon the lock 93, which has been previously moved from locking position to the position shown in broken lines in Fig. 1, is moved into its horizontal position as shown in full lines, thereby locking the reel frame against rotative movement on the rod. The braces 98 are then swung downwardly from their normally detached positions into the notches 107 of members 101, the members 105 being so formed that the engagement of the transverse portions of said braces will depress the members 105 against the tension of springs 108, and the ensuing restoration of members 105 will retain the braces in operative positions until it is desired to remove the reel from the rod.

As shown in Fig. 1, the handle 28 rotates in a clockwise direction for reeling in the line attached to and carried on the reel 11, and said handle is held stationary by means of the ratchet 77 and pawl 78 when the line is being payed out, as when a catch has been made.

The drag adjusting lever 53 is readily movable from inoperative position relative to the brake drum 22 to a position of maximum friction on the drum as applied through the brake band 40, and the intermediate positions of the lever are optional and depend upon the desired retardation of the reel as it is rotated for unwinding the reel when the line is payed out. Usually the lever 53 is adjustable for only about one half of the range of adjustment indicated by the graduated scale of adjustment on the periphery of the reel frame, thereby allowing additional adjustment as the brake band wears by continued or prolonged usage.

The auxiliary brake adjustment arms 59 and 60 are initially adjusted by means of the screw 67 so that the boss 64 will engage the lowermost point on the cam 56 when the reel is free and the brake band is expanded to a maximum extent and thereafter, as lever 53 is moved in a clockwise direction, as shown in Fig. 1, the boss 64 will gradually ascend the eccentric dwell on the cam and correspondingly move the adjustor arm 47 through the connections shown and described, thereby contracting and tightening the brake band 40 against the rim 23 of drum 22.

When winding the line on the reel 11 the handle is rotated at approximately one half the speed of the reel, by reason of the planetary back geared connections between the handle and the reel including gears 34, 35, 37, and 38. Also, by means of said gears the speed of rotation of the drum 22 may be one third or one fourth that of the reel, as may be found convenient and practicable, so that the wear on the brake band and drum is minimized.

It will be noted that the brake in the instant type of reel is mounted upon the stationary reel frame rather than on the handle as in the form of reel shown in my said former patent, hence in the use of reels of large size particularly the tensioning of the brake is more easily accomplished than if the brake were in the handle. It should also be noted that the gearing connecting the drum with the handle and with the reel is mounted in the handle where it is readily accessible and easily changed for the purpose of varying the driving ratios of the handle and brake drum, or for other purposes.

I claim:

1. A fishing reel comprising a frame, a reel rotatable thereon, a drum geared to said reel, a frictional drag associated with said drum, an adjustor on said frame operatively connected with said drag, and an operating member normally stationary on said frame and associated with said adjuster and adapted for movement within a given range, for setting said drag relative to said drum, whereby the rotation of said reel will be retarded correspondingly.

2. A fishing reel comprising a frame, a reel rotatable thereon, a drum geared to said reel, a frictional drag associated with said drum, an adjustor on said frame operatively connected with said drag, and an operating member normally stationary on said frame and associated with said adjustor and adapted for movement within a given range, for setting said drag relative to said drum, whereby the rotation of said reel will be retarded correspondingly, a graduated scale on said frame adjacent said operating member, and an indicator on said operating member movable over said scale, for indicating the extent of adjustment of said drag.

3. A fishing reel comprising a frame, a reel rotatable thereon, a drum geared to said reel, a frictional drag associated with said drum, an adjustor on said frame operatively connected with said drag, and an operating member normally stationary on said frame and associated with said adjustor and adapted for movement within a given range, for setting said drag relative to said drum, whereby the rotation of said reel will be retarded correspondingly, and a handle connected with said reel for rotating the reel in a given direction but permitting the rotation of the reel in a reverse direction without rotating the handle.

4. A fishing reel comprising a frame, a reel rotatable thereon, a drum geared to said reel, a frictional drag associated with said drum, an adjustor on said frame operatively connected with said drag, and an operating member normally stationary on said frame and associated with said adjustor and adapted for movement within a given range, for setting said drag relative to said drum, whereby the rotation of said reel will be retarded correspondingly, a handle for rotating said reel, and planetary gearing connecting said handle with said reel.

5. A fishing reel comprising a frame, a reel rotatable thereon, a drum geared to said reel, a frictional drag associated with said drum, an adjustor on said frame operatively connected with said drag, and an operating member normally stationary on said frame and associated with said adjustor and adapted for movement within a given range, for setting said drag relative to said drum, whereby the rotation of said reel will be retarded correspondingly, a handle for rotating said reel, and planetary gearing connecting said handle and said drum with said reel.

6. A fishing reel comprising a frame, a reel rotatable thereon, a drum geared to said reel, a frictional drag associated with said drum, an adjustor on said frame operatively connected with said drag, and an operating member normally stationary on said frame and associated with said adjustor and adapted for movement within a given range, for setting said drag relative to said drum, whereby the rotation of said reel will be retarded correspondingly, a handle for rotating said reel, planetary gearing connecting said handle with said reel, and a ratchet device adapted to prevent the rotation of said handle when the reel is rotated in a given direction.

7. A fishing reel comprising a stationary frame, a reel rotatable thereon, a drum mounted on said frame, an expansible and contractible friction drag fixedly held on said frame and engageable with said drum, a handle gear connected with and for rotating said reel, and an operating lever pivotally mounted on an end of said frame coaxially with said drum and operatively associated with said drag, whereby the rotation of said reel may be retarded while the same is rotating.

8. A fishing reel comprising a stationary frame, a reel rotatable thereon, a drum mounted on said frame, an expansible and contractible friction drag fixedly held on said frame and engageable with said drum, a handle gear connected with and for rotating said reel, and an operating lever pivotally mounted on an end of said frame coaxially with said drum and operatively associated with said drag, whereby the rotation of said reel may be retarded while the same is rotating, and means associated with said handle for holding the handle against rotation while the reel is rotated for paying out the line carried thereby.

9. A fishing reel comprising a stationary frame, a reel rotatable thereon, a drum mounted on said frame, an expansible and contractible friction drag fixedly held on said frame and engageable with said drum, a handle gear connected with and for rotating said reel, and an operating lever mounted on the exterior of said frame and operatively associated with said drag, whereby the rotation of said reel may be retarded while the same is rotating, an adjustor connected with said drag, and a cam on said operating member adjustably engaging said adjustor, whereby the movement of said operating member will correspondingly vary the friction of said drag on said reel.

10. A fishing reel comprising a stationary frame, a reel rotatable thereon, a drum mounted on said frame, an expansible and contractible friction drag fixedly held on said frame and engageable with said drum, a handle gear connected with and for rotating said reel, and an operating lever mounted on the exterior of said frame and operatively associated with said drag, whereby the rotation of said reel may be retarded while the same is rotating, an adjustor connected with said drag, and a cam on said operating member adjustably engaging said adjustor, whereby the movement of said operating member will correspondingly vary the friction of said drag on said reel, and cooperating means on said operating member and on said frame for indicating the extent to which said drag is adjusted.

11. A fishing reel comprising a stationary frame, a reel rotatable thereon, a drum mounted on said frame, an expansible and contractible friction drag fixedly held on said frame and engageable with said drum, a handle gear connected with and for rotating said reel, and an operating lever mounted on the exterior of said frame and operatively associated with said drag, whereby the rotation of said reel may be retarded while the same is rotating, an adjustor connected with said drag, and a cam on said operating member adjustably engaging said adjustor, whereby the movement of said operating member will correspondingly vary the friction of said drag on said reel, and an auxiliary adjustment device associated with said adjustor whereby said drag may be adjusted to compensate for wear of the drag.

12. A fishing reel comprising a frame, a reel rotatable thereon, a drum gear connected with said reel, a frictional drag associated with said drum for retarding the rotation of said reel, a manually operable cam for varying the friction of said drag on said drum, and means connecting said cam and said drag for adjusting the drag relative to the drum so as to compensate for wear on the drag.

13. A fishing reel comprising a frame, a reel rotatable thereon, a drum gear connected with said reel, a frictional drag associated with said drum for retarding the rotation of said reel, a manually operable cam for varying the friction of said drag on said drum, and means connecting said cam and said drag for adjusting the drag relative to the drum so as to compensate for wear on the drag, said means including an adjustor connected with said drag, and relatively adjustable arms associated with said adjustor, one of said arms being operatively engaged with said cam.

14. A fishing reel comprising: a frame, a reel rotatable thereon, a handle for rotating said reel and including self contained planetary gearing operatively connecting the reel and the handle, a friction drag on said frame including a drum rotatable with the reel and a friction member engageable with the drum, and means externally of said frame connected with and for regulating the operation of said friction member, for controlling the rotation of the reel.

ARTHUR KOVALOVSKY.